Figure 1:
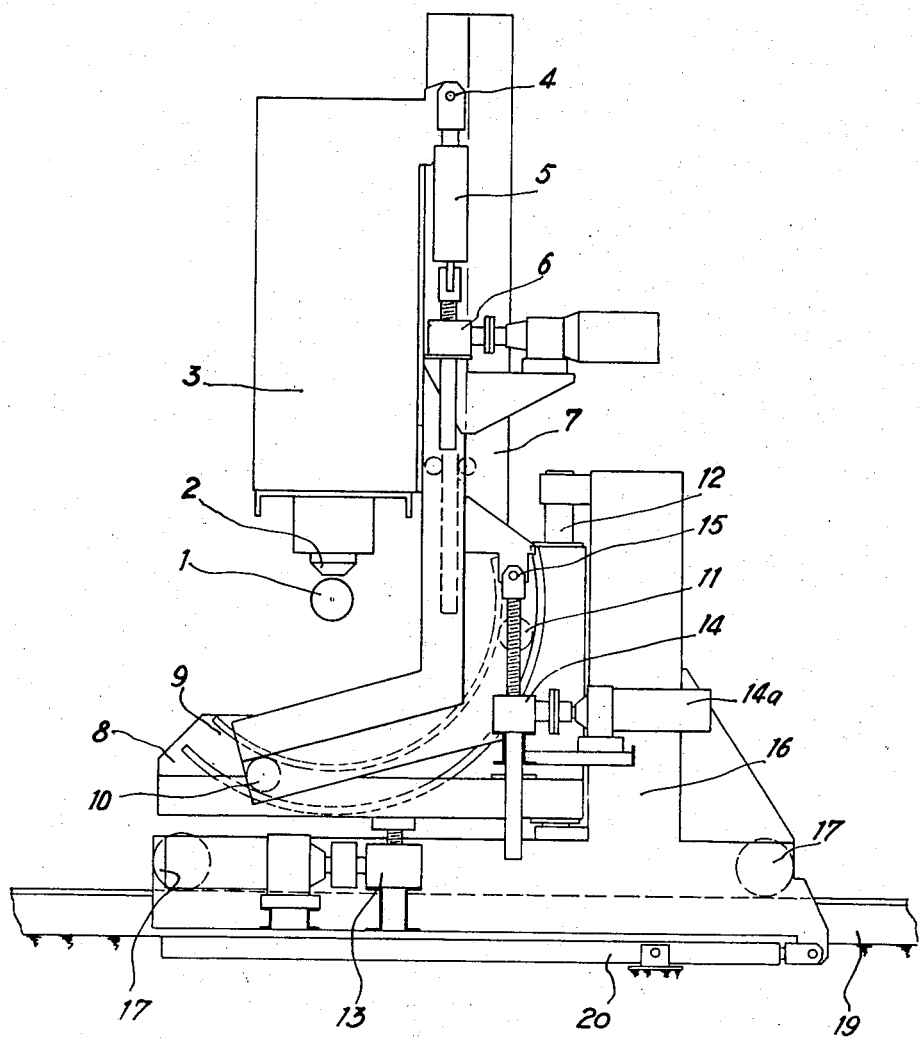

United States Patent [19]
Garnier

[11] 3,824,366
[45] July 16, 1974

[54] PROCESS AND APPARATUS FOR ANNEALING THE WELD BEAD OF A WELDED METALLIC TUBE

[75] Inventor: Andre Garnier, Aymeries, France

[73] Assignee: Vallourec Usines a Tubes de Lorraine-Escaut et Vallourec Reunies, Paris, France

[22] Filed: Oct. 11, 1973

[21] Appl. No.: 405,382

Related U.S. Application Data

[63] Continuation-in-part of Ser. No. 180,350, Sept. 14, 1971, Pat. No. 3,767,882.

[30] Foreign Application Priority Data

Sept. 17, 1970 Luxembourg.......................... 61704

[52] U.S. Cl.......... 219/10.77, 219/8.5, 219/125 PL, 236/78 B, 266/5 EI, 432/59
[51] Int. Cl. ........................................... H05b 5/08
[58] Field of Search .......... 219/6.5, 7.5, 8.5, 10.75, 219/10.77, 10.79, 10.71, 10.43, 10.53, 10.57, 62, 125 PL; 266/4 ET, 5 EI; 432/59; 236/78 B

[56] References Cited
UNITED STATES PATENTS

| | | | |
|---|---|---|---|
| 2,866,064 | 12/1958 | Keukel............................ | 219/10.77 |
| 3,252,693 | 5/1966 | Nelson.......................... | 219/10.77 X |
| 3,265,378 | 8/1966 | Grube et al...................... | 219/8.5 X |
| 3,470,343 | 9/1969 | Bilbrough .................... | 219/10.77 X |
| 3,587,268 | 6/1971 | Bricmont...................... | 219/10.77 X |

*Primary Examiner*—Bruce A. Reynolds
*Attorney, Agent, or Firm*—Breitenfeld & Levine

[57] ABSTRACT

An apparatus for treating continuously welded metallic tubes comprises a series of longitudinal inductors mounted on movable carriages which are adapted to be pivotal co-axially with respect to the tube in response to the angular position of the weld bead formed on the tube so that each of the inductors remains centered on this weld bead.

3 Claims, 7 Drawing Figures

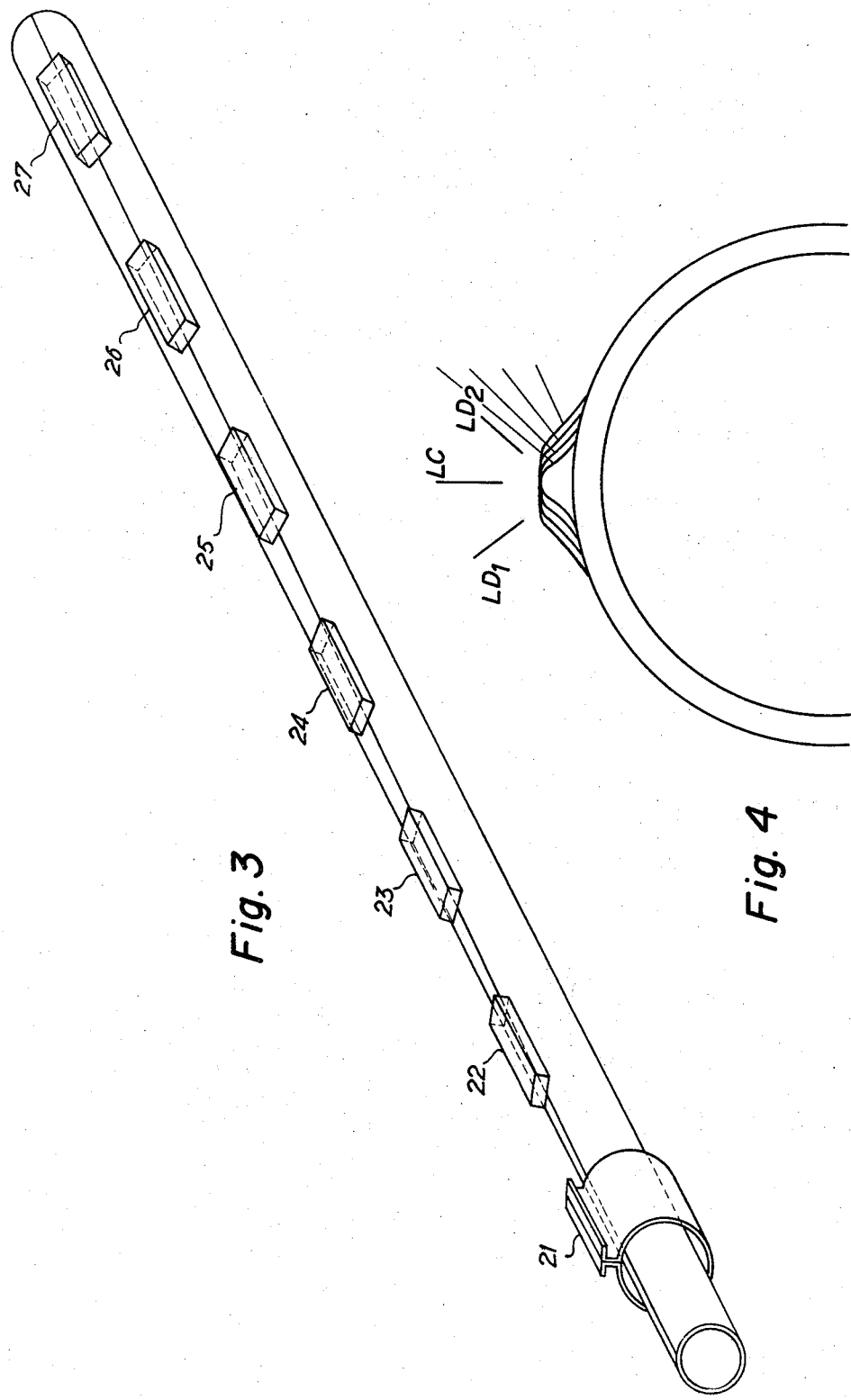

PROCESS AND APPARATUS FOR ANNEALING THE WELD BEAD OF A WELDED METALLIC TUBE

This application is a continuation-in-part of copending application Ser. No. 180,350, filed Sept. 14, 1971, now U.S. Pat. No. 3,767,882.

The present invention relates to an apparatus for treating welded metal tubes and more particularly welded tubes made of a steel which has a high elastic limit.

In the production of welded tubes from steel, a continuously travelling strip is shaped by sets of suitable rollers into a tube, the edges of which are welded in a welding station. The station can operate for example by induction with the aid of high frequency currents. It is known that it is necessary to anneal the weld bead so as to ensure that the tube has a uniform elastic limit, this annealing consisting of maintaining the weld bead at a well-established and constant temperature for a particular period. The heating of the weld bead is effected by a series of longitudinal inductors which are centred on the welding line so that the temperature decreases symmetrically on each side of the line. These inductors have to be sufficiently close together and in sufficient numbers for the heating line to be homogeneous and remain at the required temperature for a particular period, allowing for the speed of travel of the tube.

It is known that if the original strip is not perfectly rectilinear, for example if it is curved as it has a tendency to be, the weld bead is twisted. That is to say, the bead is not situated in the vertical plane containing the axis of the tube at a distance from the welding station. Because of this twisting, which may reach several centimeters over a length of a few metres, the weld bead is disposed outside the heating zone of the last of the series of inductors.

Moreover, the welding generates a temperature gradient which is symmetrical with respect to the weld. This gradient decreases in time, but there is a remanence from the stored heat, which, if twisting occurs and if the inductors are fixed, results in the temperature gradient along a plane perpendicular to the axis of the tube being non-symmetrical after passing beneath the inductors. It follows that the temperature sensing device which related to each inductor for controlling same, is not operative, upon occurrence of such a twisting, to sense the temperature of the weld bead, so that the heating operation of the respective inductor, as controlled by the temperature sensing device is not correct even if the inductors heat a zone covering the displacements of the weld bead homogeneously.

In an effort to overcome this disadvantage, it has already been proposed to displace the inductors horizontally, that is to say in a plane parallel to the plane tangent to the upper generatrix of the tube, in order to attempt to keep the heat flux centered on the weld bead. This simple solution is not sufficient once the weld bead is displaced substantially from the upper generatrix of the tube, because the heating becomes asymmetrical and the heating zone is no longer centred on the weld bead.

The main object of the invention is to provide an annealing apparatus adapted to regularly heat the weld bead of a continuously travelling welded tube, the heating being centred on the weld bead even if a relatively large and variable twisting occures.

According to the present invention, there is provided an annealing apparatus for annealing the weld bead of welded metallic tube which is continuously travelling along a given axis for a welding station, comprising a plurality of longitudinally extending inductors arranged in series relationship along said axis, each inductor being supported by a movable carriage rotatably mounted on a fixed support for angular displacement around said axis, the arrangement being such that each inductor is adapted to be disposed over the centre of the weld bead of a welded tube travelling along said axis, means for supplying AC electric power to each inductor, actuating means for controlling angular displacement of each carriage about said axis, a pair of temperature sensing devices arranged on each carriage for measuring the temperature on either side of the approaching part of the weld bead overwhich the inductor may be disposed, and, control means for comparing the measurements effected by said pair of temperature sensing devices and for operating said actuating means until the measurements are substantially equal.

Under these conditions, the heating curve of the weld bead of the tube after it emerges from the first controlled inductor remains symmetrical and the resultant gradient before passage of the bead beneath the second inductor can serve for centering the latter. Hence, the progress is by degrees and the different inductors follow the weld bead, even if it follows the form of a flattened sinusoid.

Figure 2:
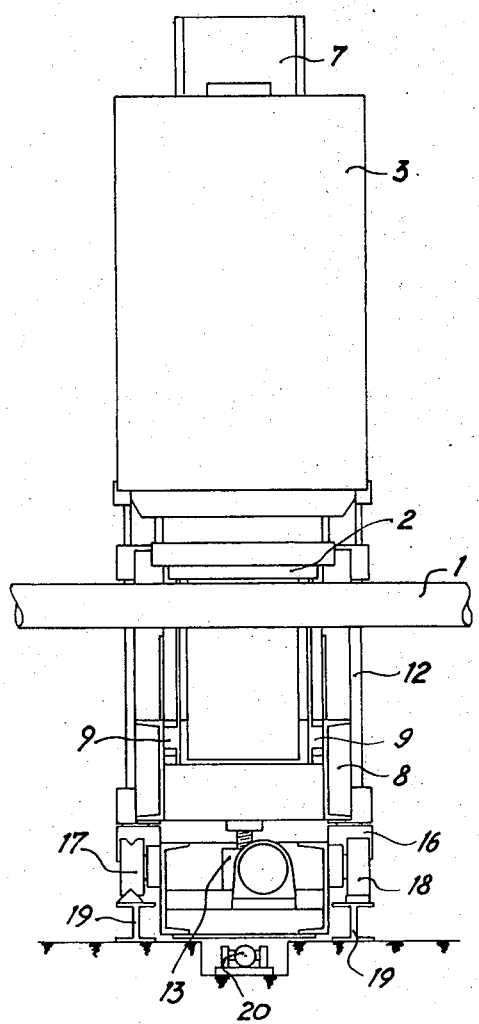
Figure 5:
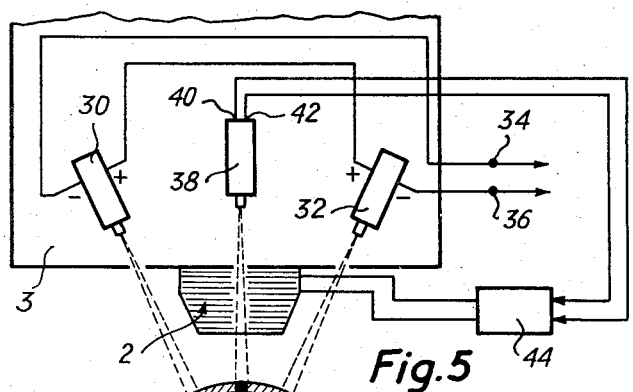
Figure 6:
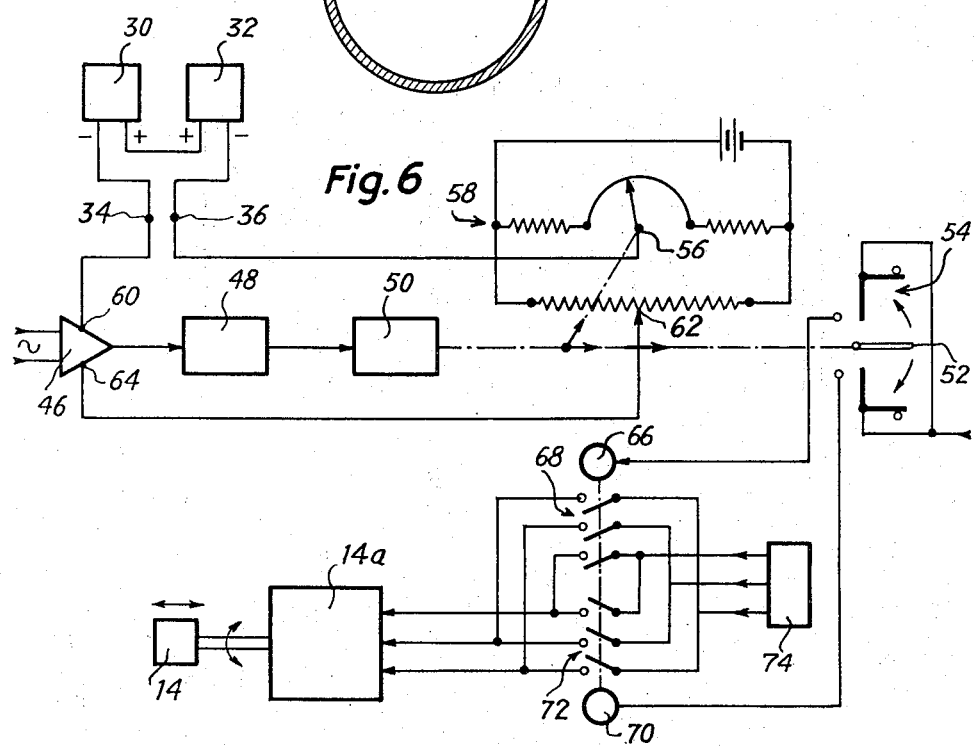
Figure 7:
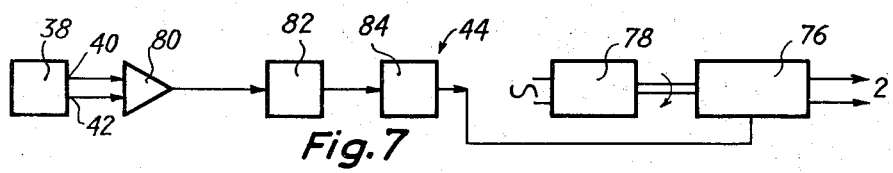

Referring to the accompanying drawings:

FIG. 1 is an end view of an embodiment of an apparatus according to the present invention, FIG. 2 is a front view of the embodiment shown in FIG. 1, FIG. 3 shows the successive arrangement of the inductors which permits obtaining a desired annealing of the weld bead, FIG. 4 shows the temperature distribution curves obtained after welding and passage of the weld beneath the different inductors, successively, FIG. 5 is a schematic end view with parts broken away showing an arrangement of the temperature measuring devices used in the apparatus of the invention, FIG. 6 is a diagram showing the interrelationship of the various means used for controlling the angular displacement of each inductor with respect to the welded tube, and, FIG. 7 is a diagram showing an embodiment of the means controlling the AC power supply to each inductor.

FIGS. 1 and 2 show a station for annealing the weld bead of a tube 1, the tube being welded, for example, by induction along the upper generatrix in a welding station (not shown) situated upstream with respect to the direction of travel of the tube through the annealing station.

The annealing is carried out by means of a plurality of longitudinal inductors such as inductor 2 which is mounted with its equipment in a housing 3 for sliding movement on a carriage 7. The displacement of the assembly comprising the inductor 2 and the housing 3 relative to the carriage 7 can be effected firstly by a screw jack 6 fixed to the carriage and secondly by a hydraulic jack 5 mounted in series with the jack 6 and pivoted at a point 4 on the housing 3.

The screw jack 6 makes it possible, to regulate the gap between the inductor 2 and the tube 1 as a function of the external diameter of the tube when the rod of the hydraulic jack 5 is fully entered.

The hydraulic jack 5 which is mounted in series with the screw jack 6, is intended to provide for the swift removal of the inductor 2 away from the tube 1 in the event of a production difficulty, for instance.

The carriage 7 is provided with rollers, such as 10 and 11, which roll in cylindrical tracks 9. These latter from part of a support 8 which slides on slideways 12 under the action of a screw jack 13. Adjustment of the screw jack 13 makes it possible to bring the axes of the cylindrical roller tracks 9 into coincidence with the axis of the tube 1 whatever the tube diameter.

A screw jack 14 is mounted on the support 8 and pivoted at a point 15 on the carriage 7. This jack 14 is actuated by a motor 14a and provides for the displacement of the rollers 10 and 11 of the carriage 7 in the cylindrical roller tracks 9 of the support 8. Thus, the carriage 7 and all the devices which are fixed thereon, and especially the inductor 2, can be turned about the axis of the cylindrical roller tracks 9 and consequently about the axis of the tube 1 which coincides with it.

Hence, the assembly 2, 3, 7 is able to turn on either side of the upper generatrix of the tube 1, so as to maintain the inductor 2 centred on the weld line whatever may be the angular displacement thereof during travelling of the tube, the spacing between the inductor and the tube remaining constant.

Preferably the stand 16, on which the support 8, the carriage 7, the housing 3 and the inductor 2 are mounted can be removed from the production line under the action of a hydraulic jack 20. For this purpose, the stand 16 rests on wheels 17 and 18 which run on rails 19.

Generally, a production line will comprise several weld bead annealing stations similar to that shown in FIGS. 1 and 2. Such a line is diagrammatically indicated in FIG. 3, showing as an example the case in which the weld bead twists towards the right.

In FIG. 3, the high frequency inductor of the welding station is indicated at 21 and the longitudinal inductors of the successive annealing stations at 22, 23 . . . 27. As shown, each inductor remains centred on the twisted weld bead thanks to measuring and control means described hereinafter which are responsive to the position of the weld control bead and adapted to the operation of the actuating means (motor 14a) adapted in turn to control the angular displacement of the respective inductor. It is obvious that the number of inductors placed along the weld bead depends on the speed of travel of the tube 1 and the desired annealing time.

As previously indicated, the angular position of each inductor is established by actuating means comprising the jack 14 and the moror 14a and is controlled as a function of the angular position of the weld bead at the entry to the corresponding annealing station. A prefered embodiment of measuring equipment and control means permitting such a controlled displacement of the inductor to be obtained is shown in FIGS. 5 and 6.

The measuring equipment provided for each inductor 2 as shown in FIG. 5 mainly comprises a pair of identical temperature measuring devices 30 and 32 operatively arranged on and secured to the housing 3 of the inductor to be operative to sense and measure the temperature on either side of the weld bead of the tube, at the portion thereof located immediatly upstream of the inductor when considering the direction of travel of the tube, that is to say the tube portion approaching the inductor.

Devices 30 and 32 are of any know suitable type such as sighting eyepiece associated with a pyrometer adapted to sense the temperature of a very small area of the exterial surface of the tube 1, and are connected in apposition relationship so as to provide between terminals 34 and 36 a differential signal representative of the difference between the temperatures measured by the two devices.

The measuring equipment is completed by another temperature measuring device 38, that is secured to housing 3 and adapted to measure the temperature of the weld line (i.e., the central portion of the weld bead) approaching the inductor. Device 38 may be of any known type such a a sighting eyepiece associated with a pyrometer adapted to provide between output terminals 40 and 42 an electric signal representative of the temperature of the area of the external surface of the tube 1 sighted by device 38. This latter signal is used, as explained hereinafter with reference to FIG. 7, to control an AC power generator 44 connected to inductor 2 for supplying AC electric power thereto and for thereby controlling the heating of the weld bead passing beneath the inductor.

FIG. 6 illustrates an embodiment of the control means provided for controlling the operation of actuating means 14–14a as a function of the differential signal appearing between terminals 34 and 36 as a result of the temperature measurement effected by devices 30 and 32. The control means comprise an amplifier 46 coupled to a reference AC electrical source and adapted through a regulator 48 to actuate a motor 50. The motor 50 actuates both a cam 52 controlling switch means 54 and the slide contact 56 of a conventional balancing potentiometer 58. The terminals 34 and 36 are respectively connected to one input 60 of the amplifier 46 and to the slide contact of potentiometer 58, the balancing contact 62 of which is connected to the other output 64 of the amplifier. Switch 54 controls energization of either a relay 66 actuating contact means 68 or a relay 70 actuating contact means 72, the closure of contact means 68 connects motor 14a to an electrical power source 74 (shown as a three phase voltage source in FIG. 6) so as to drive jack 14 in a given direction whereas the closure of contact means 72 results in the driving of the jack 14 by the motor 14a in the opposite direction.

With such a control means, it will be understood the contact means 68 and 72 are operated by switch 54 as a function of the signal of the signal between terminals 34 and 36, viz the difference between the measurement signals from devices 30 and 32. The motor 14a is actuated in either direction so as that difference be rendered nul that resulting in a centering of the inductor overhe weld bead of the tube 1.

In FIG. 7, there is shown an embodiment of the AC power generator 44 used for controlling the AC power supply to each inductor 2 as a function of the temperature of the weld time. The generator 44 comprises an alternator 76 driven by a motor 78 supplied by a conventional three phase voltage source, an amplifier 80, the inputs of which are connected to output terminals 40–42 of device 38, and a regulator 82 connected to the output of amplifier 80 for controlling the energizing circuit 84 of the alternator.

FIG. 4 shows how the heat is propagated on either side of the weld bead during the passage thereof beneath the successive inductors, the temperature maximum remaining constant at a predetermined value and being centred on the weld bead. The position of a measuring device in the form of sighting eyepieces 30 and 32 and the position of the pyrometric device 38 is indicated.

I claim:

1. An annealing apparatus for annealing the weld bead of welded metallic tube which is continuously travelling along a given axis from a welding station, comprising:
    a plurality of longitudinally extending inductors arranged in series relationship along said axis, each inductor being supported by a movable carriage rotatably mounted on a fixed support for angular displacement around said axis,
   the arrangement being such that each inductor is adapted to be disposed over the center of the weld bead of a welded tube travelling along said axis,
    means for supplying AC electric power to each inductor,
    actuating means for controlling angular displacement of each carriage about said axis,
    a pair of temperature sensing devices arranged on each carriage for measuring the temperature on either side of the approaching part of the weld bead overwhich the inductor may be disposed, and
    control means for comparing the measurements effected by said pair of temperature sensing devices and for operating said actuating means until the measurements are substantially equal.

2. An annealing apparatus according to claim 1, wherein said means for supplying AC electric power to each inductor comprise:
    an AC power generator connected to the inductor,
    a temperature sensing means adapted to measure the temperature of the central portion of the approaching weld bead part of a continuously travelling welded tube overwhich the inductor may be disposed,
   and control device responsive to the measurement effected by the temperature sensing means and adapted to control the AC power delivered by said generator to the inductor predetermined as a function of said measurement.

3. An annealing apparatus according to claim 1, in which said actuating means comprise an electric motor connected to said carriage by a gear transmitting mechanism.

* * * * *